United States Patent
Sato et al.

(10) Patent No.: US 7,513,112 B2
(45) Date of Patent: Apr. 7, 2009

(54) RESERVOIR BUILT-IN TYPE ACTUATOR

(75) Inventors: Tetsuji Sato, Hyogo (JP); Masahito Kamada, Takatsuki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 232 days.

(21) Appl. No.: 11/717,306

(22) Filed: Mar. 12, 2007

(65) Prior Publication Data
US 2007/0209357 A1 Sep. 13, 2007

(30) Foreign Application Priority Data
Mar. 13, 2006 (JP) ............................. 2006-067408

(51) Int. Cl.
*F16D 31/02* (2006.01)

(52) U.S. Cl. .......................... 60/475; 60/413

(58) Field of Classification Search ................. 60/413, 60/475, 476; 92/109, 113, 114
See application file for complete search history.

(56) References Cited

U.S. PATENT DOCUMENTS

| | | | | | |
|---|---|---|---|---|---|
| 1,560,705 | A | * | 11/1925 | Mayer | 60/475 |
| 2,927,429 | A | * | 3/1960 | Carlson | 60/475 |
| 3,640,068 | A | * | 2/1972 | Mann | 60/475 |
| 4,961,316 | A | * | 10/1990 | Corke et al. | 60/475 |
| 6,889,501 | B2 | * | 5/2005 | Busch | 60/475 |
| 7,121,089 | B2 | * | 10/2006 | Tosen et al. | 60/413 |

FOREIGN PATENT DOCUMENTS

| | | |
|---|---|---|
| JP | 2002-054604 | 2/2002 |
| JP | 2006-105364 | 4/2006 |

* cited by examiner

*Primary Examiner*—Michael Leslie
(74) *Attorney, Agent, or Firm*—Marshall, Gerstein & Borun LLP

(57) ABSTRACT

A stand pipe is disposed so as to be fitted with the inner periphery surface of a piston rod with a hollow structure and a reservoir is incorporated into the inside of the stand pipe, whereby it becomes possible to reduce the size of an EHA device. Besides, since the reservoir is separated from both an annulus-side oil chamber and a bore-side oil chamber, a stable reservoir performance can be exhibited without being influenced by a fluid pressure resulting from an external force. Moreover, as a result of installation of the stand pipe, a difference between the amount of fluid required per unit stroke in the annulus-side oil chamber and that in the bore-side oil chamber becomes smaller, so that the required volume of the reservoir oil chamber can be reduced and it is possible to constitute an efficient EHA device with little difference between the energy consumption during compressing and that during extending. Consequently, it is possible to provide a reservoir built-in type actuator capable of exhibiting a stable performance without being influenced by an external force acting on the actuator and capable of attaining the reduction in size of the entire EHA device.

4 Claims, 4 Drawing Sheets

RESERVOIR BUILT-IN TYPE ACTUATOR

BACKGROUND OF THE INVENTION

1. Field of the Invention

The present invention relates to an EHA (Electro Hydrostatic Actuator) constituted by an integral combination of a motor, a pump, an actuator and a controller. More particularly, the present invention is concerned with an improvement of a reservoir built-in type actuator capable of attaining reduction in both size and weight of the device and capable of being installed particularly in an aircraft involving strict restriction on space.

2. Description of the Related Art

Conventional aircraft of medium or larger size are equipped with a hydraulic supply system and, by utilizing the hydraulic force, there are performed operation of rudder surfaces, upping and downing of a landing gear, and braking and leg steering operations. There is a recent tendency to a total electric drive, eliminating the conventional hydraulic source driven by shaft output of an engine and for improving the fuel efficiency.

If it is possible to abolish the hydraulic supply system installed in aircrafts and each actuator can perform a self-completed type operation with electric power, not only the fuel efficiency is improved, but also such a flight system is noted as a reliable next-generation flight system. For example, in the conventional hydraulic supply system, it is always necessary to continue supply of a high pressure fluid irrespective of whether an actuator is in operation or not. However, according to the above flight system, it suffices to supply electric power only when the operation of an actuator is needed. Thus, not only the flight system in question can contribute to the saving of energy in the aspect of application, but also such a latent risk factor as a hydraulic piping of a high pressure can be eliminated.

As such actuators, two types of actuators are in practical use at present. One is EHA and the other is EMA (Electro Mechanical Actuator). In the EHA, a hydraulic system is present in the interior of actuator and a motor for a hydraulic pump to operate the hydraulic system is supplied, with power by electricity from the exterior. On the other hand, EMA is a structure using an electric motor for operation, doing away with a hydraulic system completely.

A comparison between EHA and EMA shows that EMA is simpler in structure because a hydraulic system is not installed therein and that therefore EMA is considered more advantageous for attaining reduction of both size and weight. However, in actuators for use in aircrafts where high reliability is required, EHA is adopted in many cases. Thus, with EMA, it is difficult to ensure high reliability at the present technological level. For this reason, EHA is mainly adopted (see, for example, Japanese Patent Application Publication No. 2002-054604).

For actuators used in aircrafts, various studies are being made because there exists a strong demand for attaining reduction of both size and weight. For example, in conventional actuators, a motor, a pump and a reservoir mechanism are disposed as external components, thus obstructing the reduction in size and weight of an EHA device. For solving such a problem, the applicant in the present case proposes in Japanese Patent Application Publication No. 2006-105364 a so-called reservoir built-in type actuator as an actuator attaining the reduction in size of the entire EHA device, the actuator incorporating a reservoir into a piston rod comprising a hollow structure, the reservoir having been installed as an external component in the conventional EHA structure.

SUMMARY OF THE INVENTION

As referred to above, the applicant in the present case has proposed a reservoir built-in type actuator for the purpose of reducing the size of the entire EHA device. However, in this reservoir built-in actuator which utilizes the interior of a piston, the reservoir and an annulus-side oil chamber are connected with each other so as for the fluid to be in communication, so that the reservoir function may be affected by an external force acting on the actuator.

FIG. 1 is a sectional configuration diagram illustrating the configuration of the reservoir built-in type actuator proposed in the foregoing Japanese Patent Application Publication No. 2006-105364. The reservoir built-in actuator shown in FIG. 1 incorporating a fluid pipe 6 therein is integrally constructed with an actuator body 1, a motor 2, a pump 3 and a controller 4. The reservoir built-in actuator comprises the actuator body 1 which is of a cylinder type and a piston 12 adapted to slide through the interior of a cylinder 11 in the actuator body. The piston includes a piston rod 12a and a piston head 12b.

The piston rod above is constituted as a hollow structure and fluid flow holes 9 as radial through holes are formed in plural points in the circumferential direction of the piston rod, whereby a reservoir 5 is incorporated within the piston rod. The reservoir incorporated within the piston rod has a double structure including a reservoir oil chamber 10 for the storage of fluid and a gas chamber 13 for the storage of inert gas through a free piston 14. The supply of gas, e.g., nitrogen gas ($N_2$) into a gas chamber is performed through a gas valve 15.

In the reservoir built-in actuator shown in FIG. 1, by the supply of fluid into a bore-side oil chamber 7, the cylinder performs an extending movement for extending the piston outwards (white arrow), while by the supply of fluid into an annulus-side oil chamber 8, the cylinder performs a compressing movement for compressing the piston inwards (black arrow).

When the reservoir functions normally in the above structure, the pump for fluid operates in the extending movement of the cylinder, whereby the fluid in the annulus-side oil chamber is supplied to the bore-side oil chamber. However, since the amount of fluid required per unit stroke is larger in the bore-side oil chamber in comparison with that in the annulus-side oil chamber, fluid from the reservoir oil chamber is supplied in addition to the fluid supplied from the annulus-side oil chamber. At this time, the fluid present within the reservoir is pushed out and supplied from the fluid flow holes by the pressure of the inert gas stored in the gas chamber through a free piston.

However, when an external force acts on the actuator in the piston extending direction, the fluid in the annulus-side oil chamber results in the state of a high pressure and so does the fluid stored in the reservoir oil chamber connected to the annulus-side oil chamber through the fluid flow holes. In such a case, the inert gas in the gas chamber which is sealed in by the free piston cannot withstand the fluid pressure and the fluid to be supplied to the bore-side oil chamber can no longer be supplied from the reservoir oil chamber, thus obstructing the function of the actuator.

Further, since the fluid to be duly supplied is not supplied from the reservoir oil chamber, the amount of fluid becomes insufficient and there occurs cavitation at the pump position corresponding to the fluid inlet side. Besides, concerns arise such that there may occur deterioration in performance, noise, vibration, erosion and the like in the pump due to the cavitation.

The present invention has been accomplished in view of the above-mentioned circumstances and it is an object of the invention to provide a reservoir built-in type actuator capable of attaining the reduction in size of the entire EHA device and capable of exhibiting a stable actuator performance without being influenced by an external force.

For achieving the above-mentioned object, the present inventors have made various studies about improvement of the reservoir built-in type actuator proposed previously. According to the studies, if a stand pipe is installed within the cylinder so as to be fitted with the inner periphery surface of the piston rod and a reservoir is installed on the inner surface of the stand pipe, it becomes possible to separate the reservoir oil chamber from the annulus-side oil chamber and the bore-side oil chamber. At the same time, the present inventors found out that by installing a stand pipe through the bore-side oil chamber, the amount of fluid required for operation of the bore-side oil chamber decreased and the difference between the amount of fluid required per unit stroke in the annulus-side oil chamber and that in the bore-side oil chamber became smaller, thus making it possible to reduce the required volume of the reservoir.

The present invention has been accomplished on the basis of the above findings and the gist thereof resides in the following reservoir built-in type actuators (1) to (3):

(1) A reservoir built-in type actuator in which a cylinder type actuator body and a piston having a piston rod with a hollow structure adapted to slide through the interior of the cylinder of the actuator body are included, comprising a motor, a pump for the supply of fluid in accordance with revolutions of the motor, a controller for controlling the revolutions of the motor in accordance with movement of the piston, and a reservoir for adjusting the amount of fluid to be supplied in accordance with a flow rate difference induced with movement of the piston, wherein a stand pipe is disposed so as to be fitted with the inner periphery surface of the piston rod, and the reservoir is incorporated into the inside of the stand pipe.

(2) In the reservoir built-in type actuator described in the above (1), said cylinder preferably is constructed to have an annulus-side oil chamber to which fluid is supplied when the cylinder performs a compressing movement and a bore-side oil chamber to which fluid is supplied when the cylinder performs an extending movement, and said reservoir is preferably constructed to be separated from both the annulus-side oil chamber and the bore-side oil chamber and connected thereto through fluid pipes, whereby the reservoir oil chamber is not influenced by a high pressure of fluid attributable to an external force.

(3) In the reservoir built-in type actuator described in the above (1) or (2), preferably, the reservoir is of a double structure comprising a reservoir oil chamber for the storage of fluid and an elastic support portion partitioned by a free piston, the elastic support portion having a structure which has coiled spring as an elastic support member, whereby fluid can be supplied from the reservoir oil chamber in accordance with a required amount of fluid.

FIG. 2 is a perspective view showing an actuator body according to the present invention. In the actuator according to the present invention, since the reservoir is incorporated into the inside of the stand pipe, it is not necessary to install the reservoir as an external component. Besides, since the required volume of the reservoir can be reduced by the effect of the stand pipe described above, it is possible to attain a compact shape as shown in the same figure.

In the reservoir built-in type actuator according to the present invention, there is adopted such a configuration as the reservoir oil chamber being separated from the bore-side oil chamber and the annulus-side oil chamber, but by providing not only a compressing-side channel inlet 18 and an extending-side channel inlet 19, both disposed in a conventional actuator, but also a reservoir channel inlet 20, it becomes easier to effect connection of the reservoir oil chamber through a fluid pipe without requiring complicated machining or equipment, as shown in FIG. 2.

That is, in the reservoir built-in type actuator according to the present invention, by disposing a stand pipe so as to be fitted with the inner periphery surface of the piston rod with a hollow structure and by incorporating the reservoir into the inside of the stand pipe, it becomes possible to attain the reduction in size of the entire EHA device. Besides, since the reservoir oil chamber incorporated into the stand pipe is separated from the annulus-side oil chamber and the bore-side oil chamber, a stable reservoir performance can be expected without being influenced by a high pressure of fluid which is attributable to an external force.

With use of the reservoir built-in type actuator according to the present invention, by providing a stand pipe within the cylinder, the difference between the amount of fluid required per unit stroke in the annulus-side oil chamber and that in the bore-side oil chamber becomes smaller, thus making it possible to reduce the required volume of the reservoir oil chamber.

DETAILED DESCRIPTION OF THE PREFERRED EMBODIMENTS

A reservoir built-in type actuator according to an embodiment of the present invention will be described hereinunder with reference to the drawings.

Figure 1:
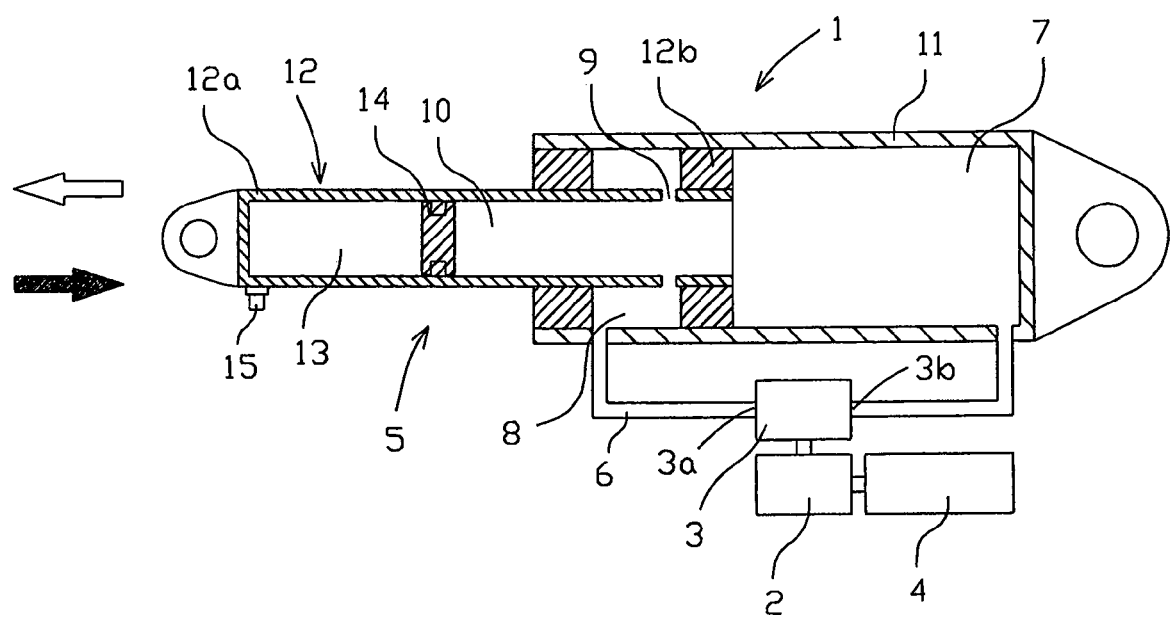
FIG. 1 is a sectional configuration diagram illustrating the configuration of a reservoir built-in type actuator proposed in Japanese Patent Application Publication No. 2006-105364.
Figure 2:
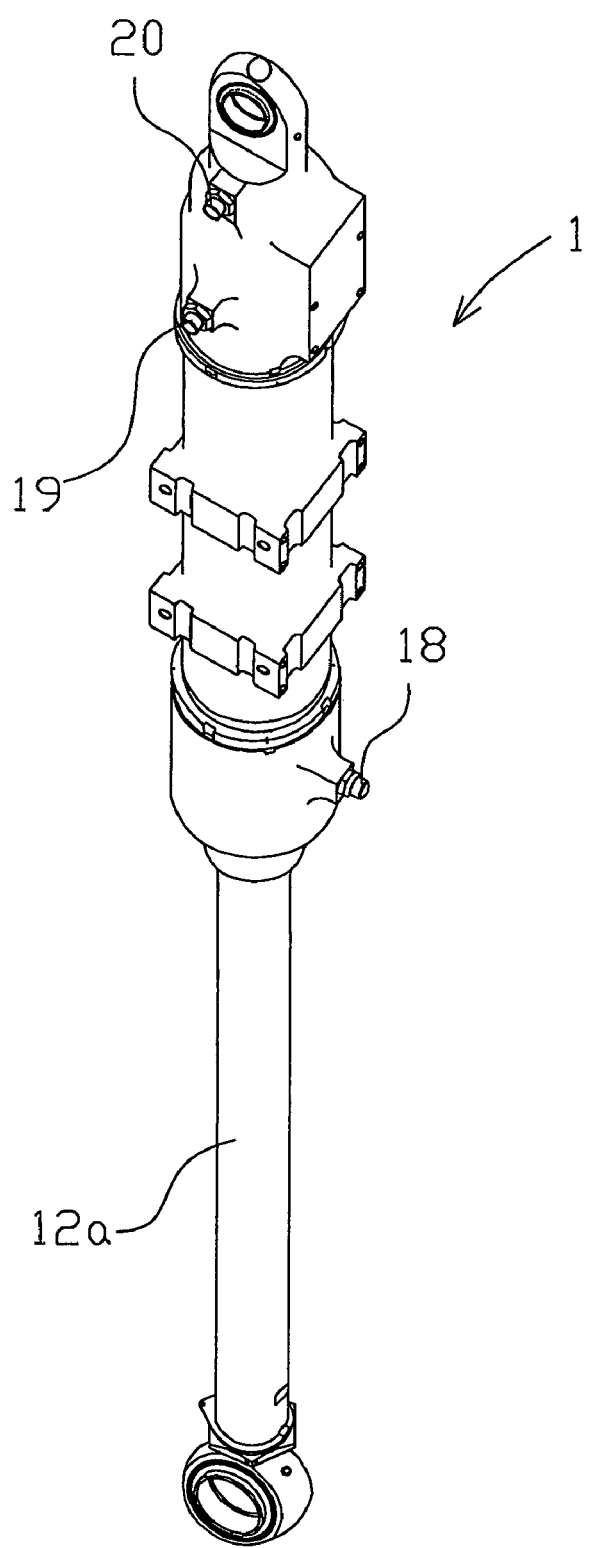
FIG. 2 is a perspective view showing an actuator body according to the present invention.
Figure 3:
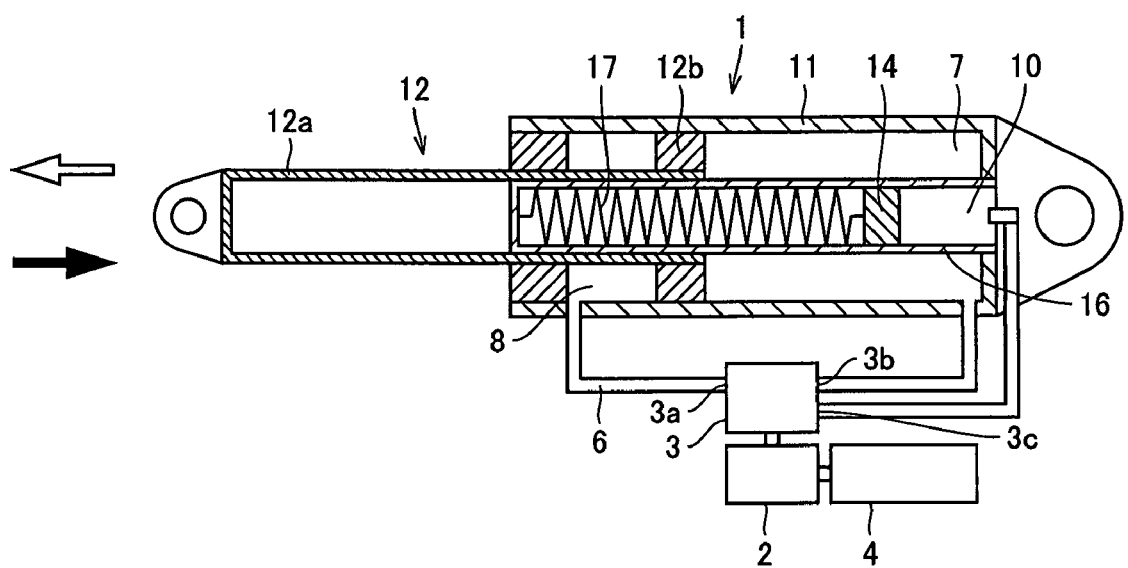
FIG. 3 is a sectional block diagram showing a reservoir built-in type actuator according to an embodiment of the present invention.

FIG. 3 is a sectional configuration diagram showing a reservoir built-in type actuator according to an embodiment of the present invention. The reservoir built-in actuator according to the present invention is used as an EHA device adapted to operate for upping and downing a leg, front leg steering, rotation operation of two wheels in one shaft located at the rearmost position of a three-shaft six-wheel type main leg, and rotation operation of any single or plural axles in a main leg having plural axles, when the device is used for a landing gear of an aircraft for example.

As shown in FIG. 3, the reservoir built-in actuator according to the present invention comprises a cylinder type actuator body 1 and a piston 12 adapted to slide through the interior of a cylinder 11 in the actuator body 1. The piston 12 is provided with a piston rod 12*a* and a piston head 12*b* and is constituted by combining the two. The piston rod 12*a* is constructed to have a hollow structure and a stand pipe 16 is disposed so as to be fitted with the inner periphery surface of the piston rod.

In the reservoir built-in actuator shown in FIG. 3, when a load is applied to the actuator from the exterior, fluid is supplied to a bore-side oil chamber 7, whereby the cylinder 11 performs an extending movement for extending the piston 12 outwards, and fluid is supplied to an annulus-side oil chamber 8, whereby the cylinder 11 performs a compressing movement for compressing the piston 12 inwards.

The reservoir built-in actuator according to the present invention is equipped with a fluid pipe 6, a motor 2 and a pump 3. As described above, when a load is applied to the actuator, the pump 3 supplies fluid into the cylinder 11 of the actuator body 1 in accordance with revolutions of the motor 2, thereby standing against the external load.

At this time, whether the cylinder 11 is to be perform the extending movement or the compressing movement depends on whether fluid is to be supplied to the bore-side oil chamber 7 or to the annulus-side oil chamber 8. Therefore, a controller 4 switches the revolving direction of the motor 2 from one to the other in accordance with the movement of the cylinder 11 and adjusts the revolutions speed of the motor.

The reservoir built-in actuator according to the present invention is constructed so that the stand pipe 16 is fitted with the inner periphery surface of the piston rod with a hollow structure and so that a reservoir 5 is incorporated into the inside of the stand pipe 16. According to such a configuration, not only it is possible to avoid an external installation of the reservoir, but also a reservoir oil chamber 10 can be separated from both bore-side oil chamber 7 and annulus-side oil chamber 8, and therefore the influence of an external force acting on the actuator is not exerted on the reservoir. Thus, the pump 3 adopted in the present invention is connected at a pump position 3a to a fluid pipe connected to the annulus-side oil chamber 8, connected at a pump position 3b to a fluid pipe connected to the bore-side oil chamber 7, and further connected at a pump position 3c to a fluid pipe connected to the reservoir oil chamber 10, respectively.

Further, the structure of the reservoir 5 incorporated into the inside of the stand pipe 16 can be made a double structure comprising the reservoir oil chamber 10 for the storage of fluid and an elastic support portion provided with an elastic support member 17 through a free piston 14. The elastic support member is not specially limited, but a commonly-used coiled spring is applicable. In case of using such a coiled spring, there may be suitably selected the type of use of single coiled spring having a required length, the type of use of plural coiled springs arranged in series to a required length with a spacer interposed between each other, or the like.

Next, operation of the reservoir built-in type actuator according to the present invention will be described. First, in case of the cylinder 11 stretching to withstand an external load (white arrow), the revolution of the motor 2 is switched in accordance with a signal provided from the controller 4 so that the pump positions 3a and 3c are incoming-side positions and the pump position 3b is an outgoing-side position. In this state, the fluid stored in the bore-side oil chamber 7, annulus-side oil chamber 8 and reservoir oil chamber 10 is released.

By operation of the pump 3 for fluid, the fluid stored in the annulus-side oil chamber 8 is supplied to the bore-side oil chamber 7, but since the amount of fluid required per unit stroke is larger in the bore-side oil chamber 7 than in the annulus-side oil chamber 8, fluid is supplied also from the reservoir oil chamber 10 in addition to the fluid supplied from the annulus-side oil chamber 8. When fluid is thus supplied sufficiently into the bore-side oil chamber 7, the piston 12 moves to its extending side in opposition to the external load.

On the other hand, when compressing the cylinder 11 against an external load (black arrow), the revolution of the motor 2 is switched in accordance with a signal provided from the controller 4 so that the pump position 3b becomes an incoming-side position and the pump positions 3a and 3c become outgoing-side positions. Then, the fluid stored in the bore-side oil chamber 7, annulus-side oil chamber 8 and reservoir oil chamber 10 is released.

By operation of the pump 3 for fluid, the fluid stored in the bore-side oil chamber 7 is supplied to the annulus-side oil chamber 8, but since the amount of fluid required for stroke is smaller in the annulus-side oil chamber 8 than in the bore-side oil chamber 7, a portion of the fluid supplied from the bore-side oil chamber 7 is stored into the reservoir oil chamber 10 through the fluid pipe 6. When fluid is thus supplied sufficiently into the annulus-side oil chamber 8, the piston 12 moves to its compressing side against the external load.

Next, an example of fluid flows in both compressing and extending movements of the reservoir built-in type actuator of the present invention will be described with reference to hydraulic circuit diagrams.

Figure 4A:
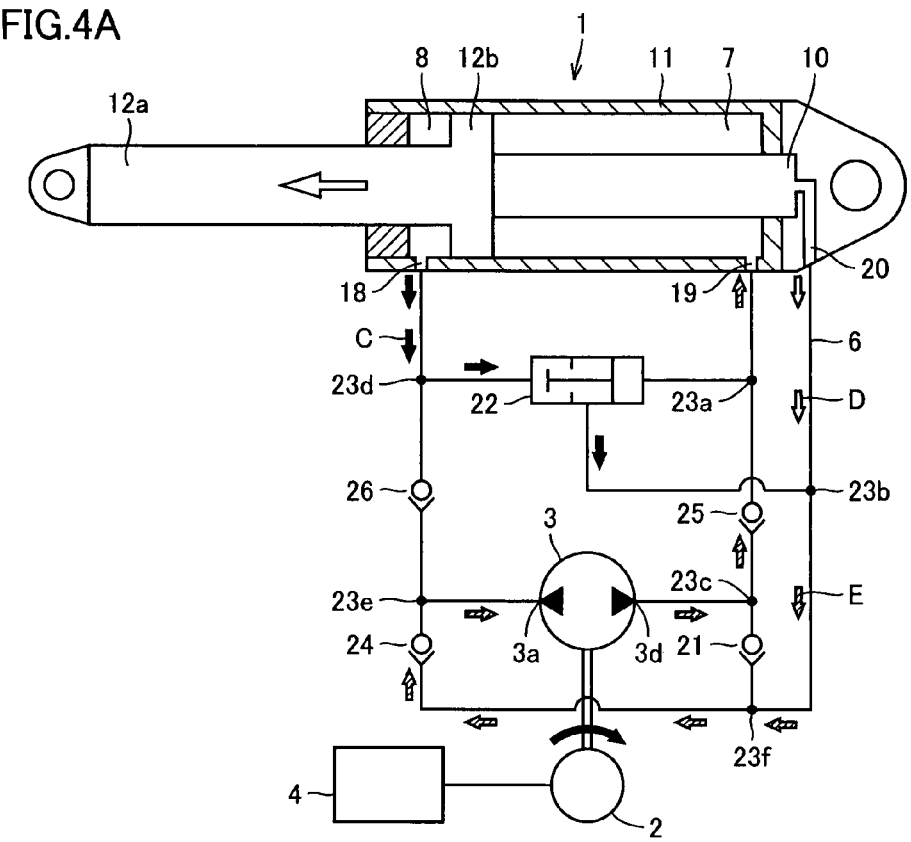
FIG. 4A illustrates a fluid flow in case of a cylinder performing an extending movement in a hydraulic circuit of the reservoir built-in type actuator according to an embodiment of the present invention.
Figure 4B:
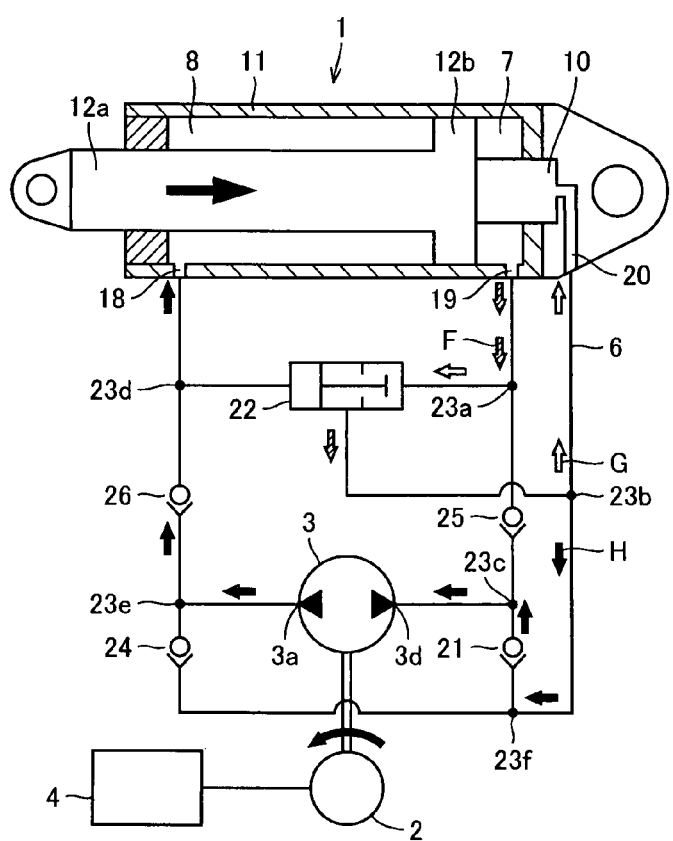
FIG. 4B illustrates a fluid flow in case of the cylinder performing a compressing movement in the hydraulic circuit of the reservoir built-in type actuator according to an embodiment of the present invention.

FIGS. 4A and 4B are hydraulic circuit diagrams in connection with the reservoir built-in type actuator of an embodiment of the present invention, of which FIG. 4A shows a fluid flow in case of the extending of the cylinder and FIG. 4B shows a fluid flow in case of the compressing of the cylinder. Provided, however, that the revolution directions of the motor 2 shown in FIGS. 4A and 4B have been set for convenience's sake to explain operation of the motor in the hydraulic circuit used in the present invention, not specifying a relation between the extending and compressing movements of the cylinder and the revolution directions of the motor.

First, in case of the extending of the cylinder 11, as shown in FIG. 4A, the motor 2 revolves clockwise (arrow A) in accordance with a signal provided from the controller 4, the pump position 3a becomes an incoming-side position and the pump position 3d becomes an outgoing-side position, and at the same time the fluid stored in the bore-side oil chamber 7, annulus-side oil chamber 8 and reservoir oil chamber 10 is released.

By operation of the pump 3 shown in FIG. 4A, the fluid stored in the annulus-side oil chamber 8 leaves a compressing-side channel inlet 18, flows along arrows C (black arrows): flowing into the channel leading to a split flow valve 22 via a branching point 23d; passing through the split flow valve 22; and thus reaching a branch point 23c. Meanwhile the fluid stored in the reservoir oil chamber 10 leaves a reservoir channel inlet 20, flow along arrows D (white arrows), and reaches the branch point 23b.

At the branch point 23b, the combined fluid with the one thus supplemented from the reservoir oil chamber 10 in addition to the other primary fluid supplied from the annulus-side oil chamber 8 flows along arrows E (hatched arrows): via branch points 23b and 23f in succession, passing through a back-flow prevention valve 24; reaching a branching point 23e; flowing into the line disposed with a pump 3 leading to a branch point 23c; passing through a back-flow prevention valve 25 and a branch point 23a; reaching an extending-side channel inlet 19; and thus being supplied to the bore-side oil chamber 7. As the fluid is thus sufficiently supplied into the bore-side oil chamber 7, the piston 12 moves to its extending side.

On the other hand, when compressing the cylinder 11, as shown in FIG. 4B, the motor 2 is switched so as to revolve counterclockwise (arrow B) in accordance with a signal provided from the controller 4 and the pump position 3a becomes an outgoing-side position, while the pump position 3d becomes in incoming-side position. Then, the fluid stored in the bore-side oil chamber 7, annulus-side oil chamber 8 and reservoir oil chamber 10 is released.

By operation of the pump 3 shown in FIG. 4B, the fluid stored in the bore-side oil chamber 7 leaves the extending-side channel inlet 19 flows along arrows F (hatched arrows): via a branching point 23*a*, flowing into the channel leading to a split flow valve 22 and passing through the split flow valve; reaching a branch point 23*b*; and being split into the two fluids where the one is to be supplied to the annulus-side oil chamber 8 and the other fluid to be supplied to the reservoir oil chamber 10.

The fluid to be supplied to the reservoir oil chamber 10 flows along an arrow G (white arrow), reaches a reservoir channel inlet 20 and flows into the reservoir oil chamber 10 to be stored. And, the fluid to be supplied to the annulus-side oil chamber 8 flows along arrows H (black arrows): passing through a branch point 23*f* and a back-flow prevention valve 21; reaching a branch point 23*c*; flowing into the line disposed with a pump 3; passing through a branch point 23*e*, a back-flow prevention valve 26 and a branching point 23*d*; reaching the compressing-side channel inlet 18; and thus being supplied to the annulus-side oil chamber 8. As the fluid is thus sufficiently supplied into the annulus-side oil chamber 8, the piston 12 moves to its compressing side.

As described above, according to the reservoir built-in type actuator of the present invention, the reservoir which has so far been installed as an external component in the conventional EHA structure is incorporated within the stand pipe, whereby it becomes possible to attain the reduction in size of the entire EHA device. Besides, since the reservoir oil chamber installed within the stand pipe is separated from both annulus-side oil chamber and bore-side oil chamber, a stable reservoir performance can be expected without being influenced by a high pressure of fluid which is attributable of an external force.

Additionally, as to the consumption of energy, a larger amount of energy is consumed in the extending movement than in the compressing movement because there occurs a difference between an effective area of a piston head acting on the annulus-side oil chamber and that acting on the bore-side oil chamber.

The larger the difference in effective area of the piston head acting on the annulus-side oil chamber and that acting on the bore-side oil chamber is, the more marked the aforesaid imbalance in energy consumption.

On the other hand, in the actuator according to the present invention the stand pipe is disposed and the actuator is designed so as to reduce the aforesaid difference in effective area of the piston head, so that it is possible to provide remedy for the imbalance in energy consumption. Thus, it can be said that the reservoir built-in type actuator according to the present invention is an excellent actuator not only from the standpoint of the foregoing reduction of size and stabilization of the reservoir performance but also from the standpoint of effective utilization of energy.

What is claimed is:

1. An actuator in which a cylinder type actuator body and a piston having a piston rod with a hollow structure adapted to slide through the interior of the cylinder of said actuator body are included, comprising:
    a motor;
    a pump for the supply of fluid in accordance with revolutions of said motor;
    a controller for controlling revolutions of said motor in accordance with movement of said piston; and
    a reservoir for adjusting the amount of fluid to be supplied in accordance with a flow rate difference induced with movement of said piston, wherein a stand pipe is disposed so as to be fitted with the inner periphery surface of said piston rod and said reservoir is incorporated into the inside of said stand pipe.

2. The reservoir built-in type actuator according to claim 1, wherein:
    said cylinder is constructed to have an annulus-side oil chamber to which fluid is supplied when said cylinder performs a compressing movement and a bore-side oil chamber to which fluid is supplied when said cylinder performs an extending movement; and
    said reservoir is separated from both said annulus-side oil chamber and said bore-side oil chamber and is connected thereto through fluid pipes.

3. The reservoir built-in type actuator according to claim 1, wherein said reservoir is constructed to have a double structure comprising a reservoir oil chamber for the storage of fluid and an elastic support portion partitioned by a free piston, said elastic support portion having a coiled spring as an elastic support member.

4. The reservoir built-in type actuator according to claim 2, wherein said reservoir is constructed to have a double structure comprising a reservoir oil chamber for the storage of fluid and an elastic support portion partitioned by a free piston, said elastic support portion having a coiled spring as an elastic support member.

* * * * *